United States Patent [19]

Sheridon et al.

[11] 4,419,680

[45] Dec. 6, 1983

[54] ELECTROGRAPHIC PRINTING SYSTEM

[75] Inventors: Nicholas K. Sheridon, Saratoga; David K. Biegelsen; Michael A. Berkovitz, both of Woodside, all of Calif.

[73] Assignee: Xerox Corporation, Stamford, Conn.

[21] Appl. No.: 166,219

[22] Filed: Jul. 7, 1980

[51] Int. Cl.[3] .......... G01D 15/08

[52] U.S. Cl. .......... 346/163

[58] Field of Search .......... 346/139, 153.1, 155, 346/162, 163; 324/327

[56] References Cited

U.S. PATENT DOCUMENTS

| | | | |
|---|---|---|---|
| 2,000,527 | 5/1935 | Linderman, Jr. | 346/163 X |
| 2,035,474 | 3/1936 | Hay | 346/162 |
| 4,082,902 | 4/1978 | Suzuki et al. | 346/163 X |
| 4,189,736 | 2/1980 | De Filipps | 346/155 X |
| 4,224,601 | 9/1980 | Davidson | 346/162 X |

*Primary Examiner*—Thomas H. Tarcza
*Attorney, Agent, or Firm*—W. Douglas Carothers, Jr.

[57] ABSTRACT

An electrographic printing system comprises oppositely opposed print and complement electrode means to produce a dielectric breakdown through a recording medium transported in a printing gap between the electrode means. A visible mark or image is formed on the surface of the recording medium by (1) forming an aperture in a portion of the recording medium or through the recording medium, (2) ablating or eroding a minute portion of solid conductive pigment medium exposed through the formed aperture, (3) inducing the formation of a pigment aerosol from the explosive effect created during pigment ablation, (4) expulsion of the pigment aerosol through the formed aperture, and (5) confinement of the pigment aerosol to the lip of the formed aperture. The aerosol deposits in the form of a torus on the aperture lip and bonds to the surface of the recording medium. Aerosol containment is created by the employment of a dielectric collar surrounding the print electrode means and the provision of a dielectric overlayer on the surface of the recording medium.

17 Claims, 15 Drawing Figures

ELECTROGRAPHIC PRINTING SYSTEM

BACKGROUND OF THE INVENTION

This invention relates to electrographic printing systems employing one or more stylus print electrodes and specifically to an electrographic printing system that accomplishes recording by means of dielectric breakdown across all or portion of the recording medium. This breakdown produces a cavity or aperture in the medium exposing a toner, pigment or contrasting medium producing a visible image. This phenomenon has also been referred to as spark discharge and electrothermographic printing.

An example of such a printing system is facsimile printers which produce marks on a recording medium comprising three layers, a thick base layer, a black conductive layer and a thin opaque white layer. Electrical discharge through the thin opaque white layer with a bare needle stylus moved over the surface of the medium, removes the opaque white layer in an imagewise manner to expose the contrasting black layer. The writing quality obtained to date with this method of printing has not been of high quality. Removal of the opaque white layer by this type of stylus leaves an image of ragged appearance.

More recently, a printing system has been suggested that employs one or more stylus electrodes together with a recording medium and a backup or complement electrode in the form of a substantially solid, conductive pigment or toner. An example of such a printing system is disclosed in U.S. Pat. No. 4,224,601. The pigment electrode may be in the form of a roller or a belt that rotates or moves in cooperation with the recording medium. Electrical pulses applied to the electrodes cause a dielectric breakdown through the medium and the establishment of a direct current flow between the energized stylus electrode and the pigment electrode without intentionally creating an aperture in the recording medium. The energy produced from this electrode energization is effective on the solid conductive pigment medium. A minute portion of the pigment medium is thermally ablated or removed, and attracted, migrated, or transferred to the recording medium forming a visible image (dot or line). Fusion of the pigment portion to the recording medium occurs under the influence of the current flow and the plastic state of the ablated pigment medium. The dot or line image produced is formed on the surface of the recording medium opposite to the stylus electrodes.

This printing system has the advantage of forming a visible image during the "creation" of the image as contrasted to electrostatic printing systems wherein a latent image is first formed, followed by toning to form a visible image and, possibly, image fusing or fixing, as occurs in conventional xerographic printers and in electrostatic stylus printers of the type disclosed in U.S. Pat. No. 3,859,960. However, the disadvantage of this printing system is that the discharge or breakdown path formed through the recording medium to obtain migration of the pigment medium to the recording medium is difficult to control. The breakdown will initially occur via the path of least resistance through the recording medium in a region close to the stylus electrode discharge. This path may not be formed directly below the stylus electrode at the time of electrode energization, as the resistivity properties of the recording medium are not uniform. Also, the amount of incremental indexing of the recording medium may not be sufficient to establish an independent breakdown path from an immediately previously established and formed breakdown path. As a result, discharge will occur again in the previously established breakdown path since this is the path of least resistance. These events continuously occurring across the recording medium produce an image of poor quality and resolution and render this printing technology unacceptable for commercial exploitation.

The electrographic printing system of the present invention operates on the dielectric breakdown principal but intentionally produces a cavity or aperture in the recording medium to permit image formation on the stylus electrode side of the recording medium. With a combination dielectric coated recording medium and a dielectric encapsulated stylus electrode, improvement in image creation and resolution can be obtained that is acceptable for commercial exploitation. This is because the creation and establishment of breakdown paths through the recording medium can be more accurately controlled than possible with the previously mentioned printing system. As a background caveat, the phenomenon occurring in the electrographic printing system disclosed herein should not be confused with the printing phenomenon occurring in printing systems as disclosed in U.S. Pat. Nos. 3,355,743; 3,377,598; 3,550,153 and 3,751,159. In the first place, each of the disclosed systems involve an electrostatic discharge phenomenon wherein a transfer of the toner or pigment medium is accomplished by the establishment of an electric field via a displacement current. The pigment medium migrates to the recording medium under the influence of the electric field created during localized heat energization. The printing system disclosed herein involves the establishment of a dielectric breakdown across a portion of or all of the recording medium and a direct current flow during stylus energization.

Secondly, printing in each of the systems disclosed in these patents occurs on the surface of the recording medium opposite to the stylus electrodes. In the printing system disclosed herein, printing occurs on the same side of the recording medium as the stylus electrodes.

SUMMARY OF THE INVENTION

Accordingly, the electrographic printing system of this invention relies on current flow for writing with the formation of a cavity in or aperture through the recording medium exposing a toner or pigment medium and the formation of an ablated minute portion of that pigment medium into a pigment aerosol and subsequent controlled deposition of the created aerosol on the stylus side of the recording medium. The deposition of the ablated pigment portion is controlled by (1) forming an aerosol of pigment particles, that are highly reactive, (2) confining the movement of the aerosol through a cavity formed in a portion of the recording medium or an aperture formed through the recording medium and (3) confining the deposition of the aerosol onto the recording medium to immediately adjacent areas of the aperture to form a compact visible image having a high peripheral contrast with adjacent regions of the recording medium.

The electrographic printing system comprises print electrode means which includes at least one print electrode with a print end portion. A dielectric collar surrounds the print end portion. Complement electrode means is positioned in opposite and opposed relation to the print electrode means. These electrode means form a printing gap through which the recording medium is moved. The medium must have a predetermined level of resistance. Preferably, the print electrode side of the medium has a dielectric layer or surface.

For producing a visible image, the recording medium itself or the complement electrode means itself includes an electrically conductive pigment medium. The toner medium, however, does have a resistance level, i.e., the medium is not characterized as a pure conductor of current.

When a voltage pulse is applied across the recording medium between the electrode means, a dielectric breakdown is induced through the recording medium. A current flow is established which is sufficient to create an aperture in the recording medium. The current flow and accompanying electric field provide a sufficient level of energy to cause the erosion, via $I^2R$ heating or filamentary plasma, of a minute amount of the pigment medium. The result is an explosive effect that produces a pressure rise expelling pigment particles in the form of an aerosol through the formed aperture toward the print electrode means.

The phenomenon of the present invention has not been completely clarified physically and theoretically, and while not desiring to be bound to the following theory, it is offered as an explanation of what is believed to be occurring in the production of highly compact and controlled density deposit of pigment particles on the surface of the recording medium during image formation.

The particles present in the aerosol are believed to have highly activated surfaces. Their reactive nature is believed to be formed during the electrical discharge and resulting explosive effect. Free radicals of various molecules making up the pigment medium are created and form particles in the aerosol.

The most important aspect of this invention is the control of the formed aerosol containing these highly reactive pigment particles through the formation of an aperture and forcing these particles to be deposited into intimate contact with recording medium in regions immediate of the aperture where they are bonded tenaciously, increasing the pigmented density of the created mark or dot.

The highly reactive particles created in the aerosol want to immediately react with other matter since they are free radicals created during the explosive effect upon electrode discharge. We have discovered that a combination dielectric collared stylus electrode with a dielectric covered recording medium can be employed to produce pigment aerosols, the deposition of which can be controlled to produce crisp, straight and compact image marks that provide an electrographic printing system of higher resolution compared to the previously known and contemplated dielectric breakdown printing systems.

Other objects and attainments together with a fuller understanding of the invention will become apparent and appreciated by referring to the following description and claims taken in conjunction with the accompanying drawings.

DESCRIPTION OF THE PREFERRED EMBODIMENT

The components comprising the electrographic printing systems to be explained are, in some cases, shown separated for clarity. In practice, the print and complement electrodes are in engagement with the recording medium.

Figure 1:
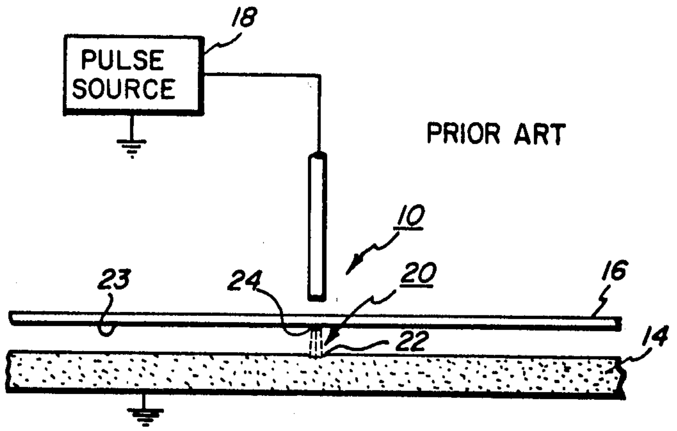
FIG. 1 is a schematic illustration of an electrographic printing system of the prior art utilizing dielectric breakdown recording phenomena.

In the prior art dielectric breakdown recording of FIG. 1, image creation occurs during electrode discharge. System 10 comprises a stylus electrode 12 connected to a pulse source 18. The complement electrode essentially comprises pigment and a solid conductive medium 14. Medium 14 may take various forms, such as, a pigment sheet supported by a backup drive roller (not shown) or a backup roller upon which the conductive pigment medium 14 is deposited. Between the electrode 12 and medium 14 is the printing gap 20 through which the recording medium 16 passes. The recording medium is ordinary paper.

Upon energization of the stylus electrode 12, a discharge of sufficient magnitude is created to cause a dielectric breakdown across the paper recording medium 16 to produce a current flow between the electrode 12 and the pigment medium 14. A current plasma is established and is permitted only to enter its formative stages, i.e., it does not remain of sufficient duration to create an aperture in the recording medium. The energy is sufficient to thermally ablate a minute portion of the pigment medium, illustrated at 22 in FIG. 1. That is, during the electrical discharge and current plasma establishment, a minute portion of the pigment medium 14 at 22 is resistively heated to a high temperature and relesaed from the surface of the medium with the aid of established electric fields. The plasma and accompanying electric fields cause the dislodged pigment to transfer to the underside 23 of the recording medium 16, as illustrated at 24. Due to the somewhat molten state of the pigment 24 and the field forces present in the printing gap 20, the pigment adheres to the recording medium.

The principal drawback of this system is the inability to control the precise location of the path of electrical discharge through the recording medium and the ultimate point of deposition of the toner portion 24. As a result, there is not sufficient control over the formation of marks and the placement and position of pigment marks to form an overall image of acceptable resolution.

We have found that in using the electrode configuration of FIG. 1, there exists a statistical variation of marks relative to the stylus electrode position due primarily to inhomogeneities in the paper recording medium. The density and porosity of the recording medium may be variable from point to point due to the random nature of the fibers in the paper recording medium. Some medium locations provide for easier breakdown than other medium locations. Medium damage, due to a previous deposition of a formed mark 24, provides a strong competitive path for a subsequent and adjacently desired breakdown. Under the best of conditions, the reliability of the placement of adjacently positioned marks on medium 16 could not be closer than 15 mils without having dielectric breakdown occur through neighboring channels and deposited marks 24.

The pressure applied to the electrode 12 plays a significant role in the size of the spot obtained with the electrode system 10. If the pressure is not uniformly maintained, the spot or mark 24 size will widely vary. The best results are obtained when electrode 12 is pressed firmly against the medium 16. However, stylus electrode positioning against the medium and subsequent withdraw from the medium, to permit indexing of the recording medium 16, is impractical.

In employing system 10, an aerosol partially composed of toner or pigment particles is created during electrode discharge. This aerosol is released from point 22 of the toner medium surface. Depending upon the nature of the contact between the recording medium 16 and the toner medium 14, the pigment particles arrive at the recording medium over a large area, creating a plurality of marks 24 of irregular shape and variable size.

Figure 6:
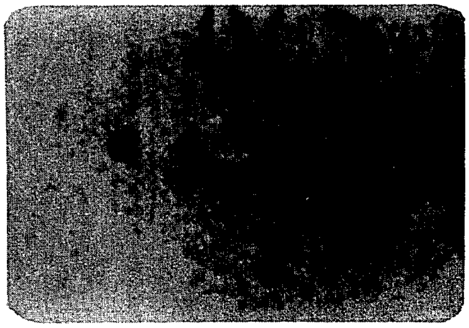
FIG. 6 is a photomicrograph of a line consisting of 5 mil spaced marks produced on a plain paper recording medium employing the electrode system of FIG. 1.

FIG. 6 illustrates the results when employing system 10 to form a line of marks 24 on the undersurface of an indexed paper recording medium 16. The spacing between stylus electrode discharge events was 5 mils. Clearly, discharge and mark deposition did not occur at 5 mil spacings on the medium surface. Rather, the resulting marks averaged about 15 mils apart and did not form a straight line. Discharges appear to occur through the medium at proximity points representing paths of least resistance through the medium.

We have discovered that by using electrode configurations illustrated in FIGS. 2, 3, 4, 5 and 12, the deposition and placement of pigment particles can be greatly improved in forming visible images of acceptable resolution.

Figure 2:
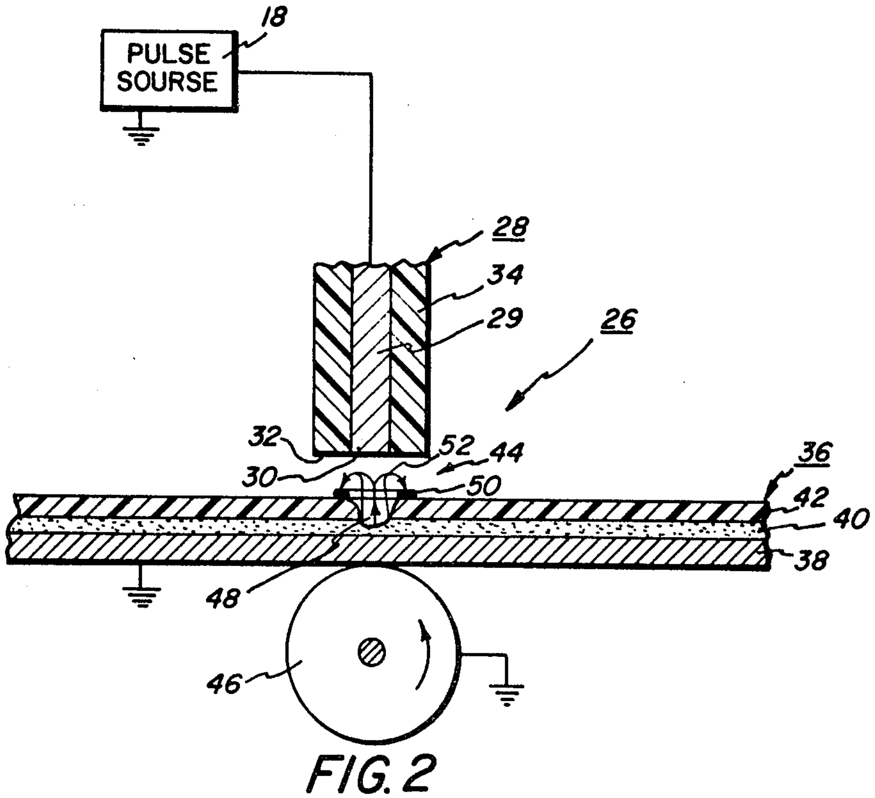
FIG. 2 is a schematic illustration of an electrographic printing system of this invention.

As shown in FIG. 2, the electrographic printing system 26 includes electrode means 28 comprising a stylus electrode 29 having a stylus end portion 30 penetrating through the end surface 32 of a dielectric support or collar 34. The stylus electrode end portion 30 is flush with the surface 32. The dielectric support is large enough to support the electrode 29 in system 26. The dielectric material may be Teflon but preferably is a more rugged and harder dielectric material, such as, synthetic ruby or diamond material. This material should have a low frictional drag characteristic relative to the recording medium 36. This is because the collar end surface 32 acts as a pressure pad against the recording medium.

The dielectric collar 34 performs two important functions. First, the lateral extent of any mark deviation in its desired position appears to be controlled by the region of intimate contact between the dielectric surface of the recording medium and the collar end surface 32. Secondly, the collar 34 aids in controlling mark position and size so that subsequent discharge through previously formed, neighboring apertures does not occur down to minimal mark spacings, such as, 5 mils. Thus, straight continuous marks and lines can be formed.

The diameter of the stylus electrode 29 may, for example, be 3 mils while the diameter of the collar may be about 7 to 10 mils. The diametrical limits of collar 34 depend upon the diametrical extent of the electrode 29 and the size of the mark desired to be produced (aperture plus produced pigment torus). An example of a good stylus to collar relationship is that the diametrical extent of collar 34 be 3 times that of the stylus electrode 29.

The lower diametrical limit for stylus electrode 29 is about 0.5 mils. The diametrical extent of collar may be 1 or 2 mils.

The recording medium to be employed with stylus electrode 29 preferably has a dielectric surface. Such a surface has been found to be helpful in establishing a well defined pigment torus, as will be explained in greater detail. The use of a recording medium with a dielectric surface or layer permits control of mark size and mark density.

The combination electrode structure of this invention and a dielectric surface recording medium render mark size and density more readily a direct and controllable function of the excitation energy level employed to produce the mark.

The recording medium in FIG. 2 is a Telecopier recording medium, such as, used with the Xerox 400/410 Telecopier. Medium 36 comprises a conductive paper base or substrate 38 with a contiguous layer 40 of conductive pigment material. This material may comprise a carrier with heavily loaded carbon black, or carbon loaded plastic material, such as, polyolefin or a carbon loaded wax. The overlayer 42 is a white dielectric material. The dielectric overlayer 42 is much thinner than pigment layer 40 and substrate 38. The substrate is a substantially conductive medium having a resistively level of about 2,000 ohms per square.

The recording medium 36 is supported for indexed movement through the printing gap 44 by a rotatably mounted conductive roller 46.

The complement electrode for electrical discharge in the configuration of FIG. 2 is, in essence, the conductive pigment medium 40 and the conductive substrate 38 of medium 36. Roller 46 can be considered part of the counterelectrode means.

In operation, we believe that the following printing phenomenon occurs. Upon electrical discharge, a cavity 48 is formed in medium 36 through the dielectric layer 42 to the pigment material of layer 40. The energy produced causes localized heating of pigment. An explosive effect is created, which combine with the localized heating, dislodge pigment particles from layer 40. The instantaneous increase in pressure in the cavity 48 caused by the explosive effect forms the dislodged pigment particles into an aerosol. Due to the geometric confinement of the aerosol to cavity 48, the aerosol is forced upward through the cavity 48. The aerosol is deposited in regions immediately adjacent to cavity 48 in the form of an irregular torus 50. The movement of the aerosol is represented by the arrow 52.

The formation and movement of the aerosol is most likely due to the combined effect of the increase pressure and heat occurring during discharge of the electrode means as well as a residual electric field effect remaining after termination of the pulse energization.

Figure 8A:
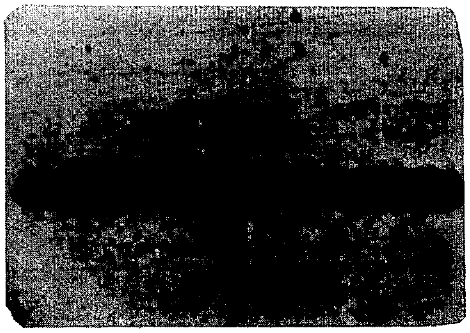
FIG. 8*a* is a photomicrograph of a line consisting of 5 mil spaced marks produced on a telecopier recording medium employing the electrode system of FIG. 2.
Figure 8B:
FIG. 8*b* is the photomicrograph of FIG. 8*a* with greater magnification.

The photomicrograph of FIG. 8*a* shows a line of 5 mil spaced marks produced on a Xerox 400/410 Telecopier recording medium. FIG. 8*b* is a greater magnification of the line of marks of FIG. 8*a*. The 5 mil spacing visibly produces a solid straight dark line with substantially uniform boundary definition. These boundaries can be seen more clearly in FIG. 8*b*. Note that the deposited pigment particles (the grayish areas) are in areas immediately adjacent to discharged cavities (the darker or blacker areas) formed in the dielectric overlayer 42. These deposit areas are between and along the outer edges of the formed cavities 48 in the recording medium 36.

Figure 7:
FIG. 7 is a photomicrograph of a line consisting of 5 mil spaced marks produced on telecopier recording medium employing the electrode system of FIG. 1.
Figure 9A:
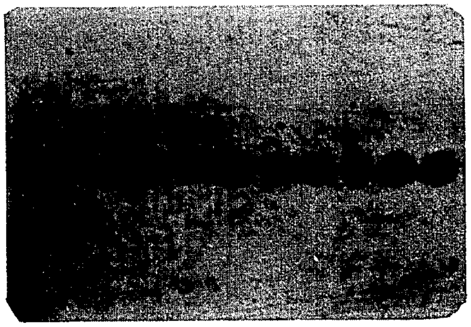
FIG. 9*a* is a photomicrograph of a line consisting of 15 mil spaced marks produced on a telecopier recording medium employing the electrode system of FIG. 2.
Figure 9B:
FIG. 9*b* is the photomicrograph of FIG. 9*a* with greater magnification.

The photomicrograph of FIG. 9*a* shows a line of 15 mil spaced marks produced on a Xerox 400/410 Telecopier recording medium. The 15 mil spacing visibly produces a straight line of marks each having substantially uniform boundary definite. Note in FIG. 9*b* that the pigment particles are deposited in areas immediately adjacent to or at the boundaries of the formed cavities 48 providing irregular shaped tori 50. The tori 50 are the grayish areas immediate of the darker cavity areas. For comaprison purposes, reference is made to FIG. 7. FIG. 7 shows a line 5 mil spaced marks produced on a Xerox 400/410 Telecopier recording medium employing the prior art system 10 of FIG. 1. When comparing with FIG. 8*a*, the resulting line of marks is quite clearly of lower quality. Close examination reveals that marking is accomplished only by removal of the opaque white dielectric overlayer 42. There is no appreciable deposition of removed pigment particles in areas immediate of formed cavities. We believe that any formed aerosol of these particles is dispersed from the regions of the formed cavities and, therefore, does not contribute to the marking process. This comparison demonstrates the importance of the dielectric collar 34, which provides an important function relative to aerosol formation containment and deposition to the region at the lip of the formed cavity or aperture. The pigment aerosol is confined with the aid of collar 34 to areas immediately adjacent to the formed cavity or aperture, bonding with the recording medium in these areas to produce smooth, continuous dark lines or marks.

Studies showed that good quality lines and marks can be obtained down to 100 volt discharges with system 26. The energy required to produce good marks is in the order 1 millijoule. Because the sheet resistance of Xerox Telecopier 400/410 recording medium is about 2,000 ohms per square, the 1 millijoule energy level required for good marks could not be easily obtained at voltages less than 100 volts. At least than 100 volts, proportionately lighter marks are obtained.

We believe that the chemical nature of the formed aerosol also plays an important role in the improved mark formation demonstrated in FIGS. 8 and 9 as compared to FIG. 7.

A great many of the pigment particles in the formed aerosol are believed to be free radicals, i.e., very reactive chemical groups. They are high energy particles desiring to be recombined or attracted to other surfaces and materials. We use the term "free radicals" to explain what we believe is physically and chemically occurring, although we do not conclusively know if this is what is actually occurring or all that is actually occurring. In the broadest sense, a free radical marking process is initiated within an electric discharge and the formation of a strong electric field in which there is a high magnitude of energy. With so much energy present, chemical reactions are made to occur. Free radicals or very reactive chemical groups are produced. These radicals are chemicals produced by the breaking up of more complex chemical molecules making up the pigment medium. These radicals are very reactive and unstable. They may be pigment particles themsevles and form a constituent of the formed aerosol. They come to the surface of the recording medium as part of the aerosol. Due to the nature of the dielectric environment at the surface of the recording medium, particularly the presence of the dielectric collar 34, these free radicals with pigment particles are caused to dwell near the surface of the recording medium in areas immediate of the formed cavity or aperture. This period of dwell (in piecoseconds) is believed to be longer than a comparable period of time inherent in prior art system 10. In system 10 as employed in FIG. 7, there is no "delay" effect imposed upon the aerosol. The dwell is sufficient to "hold" the aerosol to the cavity or aperture region. Due to the reactive nature of the aerosol, the aerosol is deposited on the recording medium, forming the pigment rim or torus. The pigment particles react very quickly with the recording surface and are chemically bonded to the surface of the recording medium.

An important aspect of this phenomenon is that the pigment particles clearly bond into the surface of the medium, i.e., they chemically attack or chemically react with the recording medium surface.

All the foregoing explanation relative to the marking phenomenon is true for the system arrangements shown in FIGS. 3–5 and 12. The principal difference of these arrangements from system 26 in FIG. 2 is the recording medium.

Figure 3:
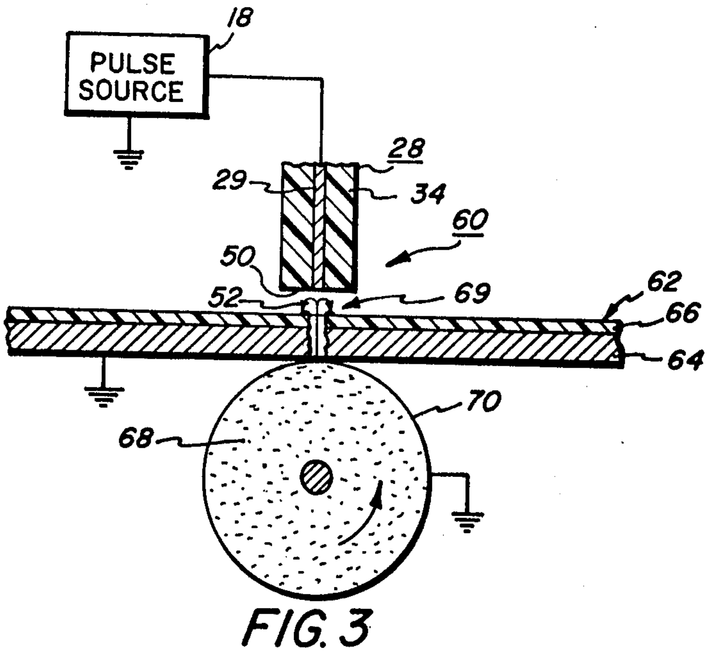
FIG. 3 is a schematic illustration of the electrographic printing system of this invention employing a different recording medium comprising dielectric coated paper.

In FIG. 3, the electrographic printing system 60 comprises the stylus electrode means 28 of FIG. 2, a recording medium 62 and a conductive pigment medium 68 in the form of a backup roll 70. In this configuration, the complement electrode means comprises the medium substrate 64. The pigment medium 68 may be considered as part of this electrode means.

The recording medium 62 comprises a substantially conductive paper base or substrate 64 with a very thin contiguous dielectric layer 66. This type of recording medium is employed with stylus printers and plotters manufactured by Versatec, Inc., in Santa Clara, Calif.

Figure 4:
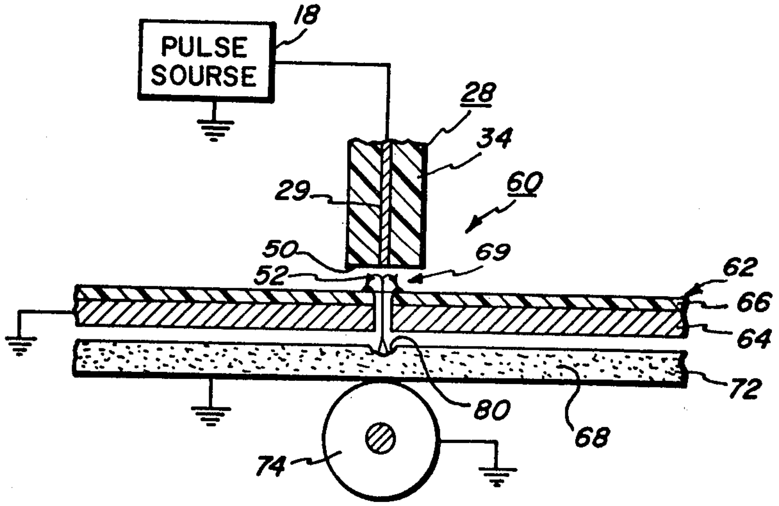
FIG. 4 is a schematic illustration of the electrographic printing system of FIG. 3 illustrating a modified pigment medium.

In FIG. 4, the physical form of the pigment medium 68 is in the form of a continuous sheet 72 which is moved through the printing gap 69 along with the recording medium 62. Backup roll 74 supports the movement of these mediums through the printing gap 69. Roll 74 may be considered as part of the complement electrode means in combination with the conductive substrate 64 of recording medium 62 and the conductive pigment medium 68.

Figure 5:
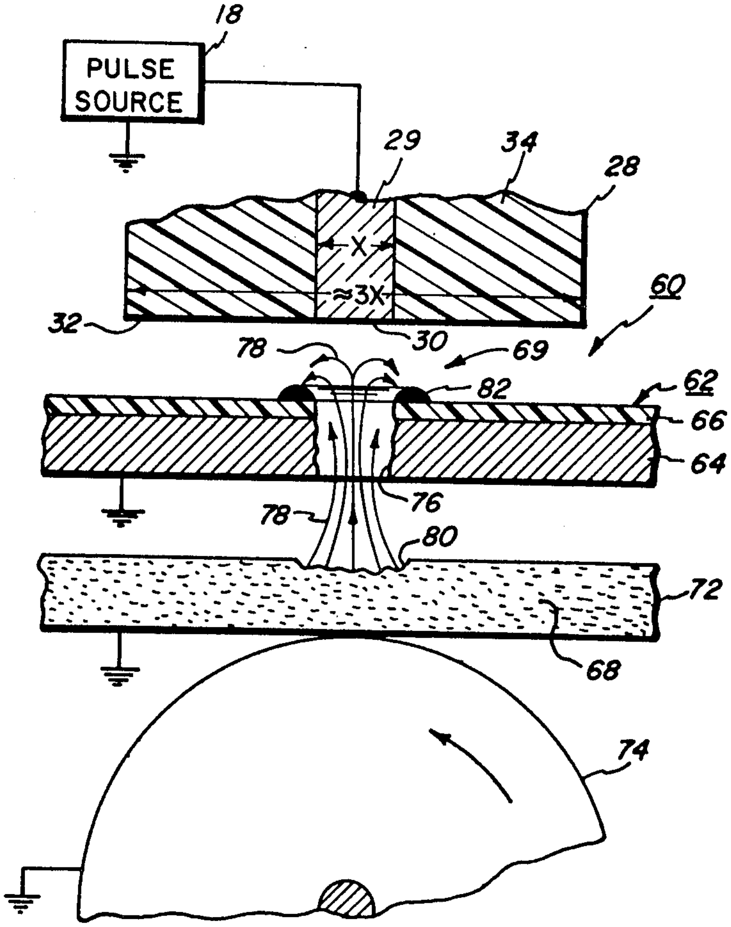
FIG. 5 is a detailed illustration of the region of marking occurring in the system of FIG. 4.

FIG. 5 is an enlarged detail of FIG. 4 to depict aperture formation and aerosol deposition upon energization of the electrode means 28.

Upon electrical discharge, dielectric breakdown occurs across the recording medium 62 to the conductive pigment sheet 72. The temperature created during discharge are sufficient to oxidize and burn medium material and fibers creating a spark channel or aperture 70. This large rise in temperature also super heats the air present and the air quickly expands creating the mentioned explosive effect. The expansion of the air or gas may contribute to the further opening of the formed channel 76 and contributes to the formation of the pigment aerosol and its transport to the print electrode side of the recording medium. Pigment particles in region 80 are removed by localized heating and an explosive effect, during electrode energization as well as by the influence of the residual electric field after electrode energization. An aerosol is created including the formation of free chemical radicals. The explosive effect and field force directs the pigment aerosol through the aperture 76 toward the end surface of the electrode means 28, as indicated by arrows 78. The combined influence of the dielectric collar 32 and dielectric layer 66 is believed to confine the highly reactive aerosol to the immediate region of the recording medium in the printing gap 69. Due to the aerosol's high reactive nature, the aerosol pigment particles chemically bond to the surface of layer 66 at the lip area of the aperture 76, forming an irregular torus 82. The torus contour is generally governed by the irregular shape of the produced aperture 76.

Figure 10:
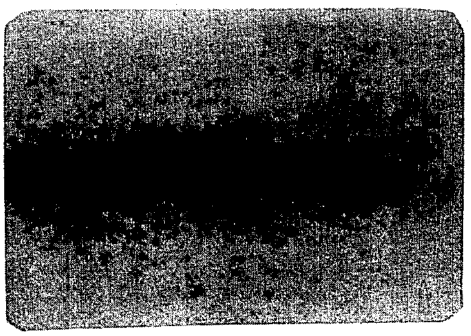
FIG. 10 is a photomicrograph of a line consisting of 5 mil spaced marks produced on a recording medium comprising a dielectric coated paper employing the electrode system of FIG. 4.

The photomicrograph of FIG. 10 shows a line of 5 mil spaced marks produced on a recording medium 62 employing electrode means 28. Continuous straight lines and confine marks are produced on the surface of dielectric layer 66.

Greater energy is necessary to produce marks with recording medium 62 as compared to recording medium 36. Power levels required for producing good marks on recording medium 62 is about ten times that required for recording medium 36, such as 900 to 1500 volts. This is because the resistivity level of medium 62 is higher, being about 25 megohms per square. Secondly, an aperture 76 through the entire medium 62 as opposed to a cavity in a dielectric layer 42 of medium 36, must be formed. Third, the pigment mediums 68 of roll 70 and sheet 72 are independent of the recording medium itself. The aerosol must be created on one side of the recording medium, directed through formed aperture 76 for deposition on the opposite or stylus electrode side of the recording medium.

Figure 12:
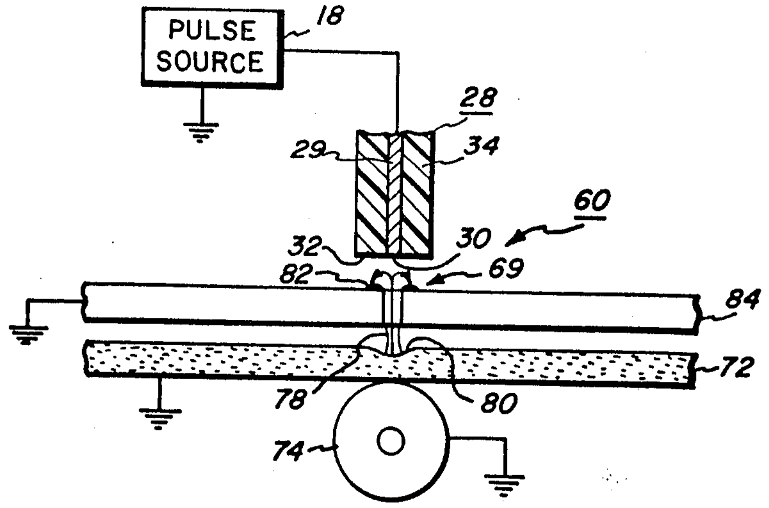
FIG. 12 is a schematic illustration of the electrographic printing system of this invention employing a recording medium comprising ordinary photocopying paper.

In FIG. 12, stylus electrode means 28 is employed in the electrographic printing system 60 with a recording medium 84 comprising paper, for example, Xerox 4040 paper. In employing medium 84, best results are obtained if lower melting temperature waxes are used as the pigment medium rather than carbon loaded polyolefin, for example. Less energy is required to remove pigment particles from the surface of the pigment medium. A conductive wax mixture with dispersed carbon black is a suitable pigment medium. Such pigment mediums are known in the art. The sheet resistivity of these mixtures may be about 25,000 ohms per square.

Figure 11:
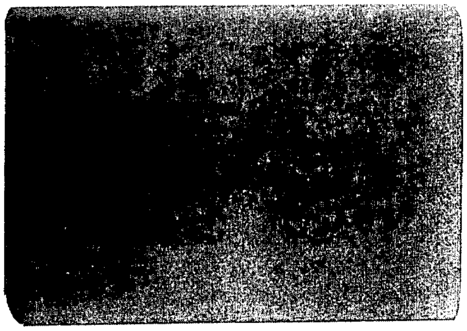
FIG. 11 is a photomicrograph of a line consisting of 5 mil spaced marks produced by the electrographic printing system illustrated in FIG. 12.

The photomicrograph of FIG. 11 shows a line of 5 mil spaced marks produced with the system shown in FIG. 12. The marks vary from about 5 to 20 mils apart. Although the resolution and spacing of these marks is improved over those produced by the prior art system 10 shown in FIG. 6, the line of marks is not as resolved as those produced with employment of recording mediums 36 and 62. This strengthens the fact that the dielectric overlayer of mediums 36 and 62 plays an important role in cavity or aperture formation at desired medium locations while the dielectric collar 34 contributes to causing the pigment aerosol to bond to the dielectric overlayer at the lip of the formed cavity or aperture. Both of these roles together successfully contribute to mark and line optimization, which is not achievable by system 10.

Figure 13:
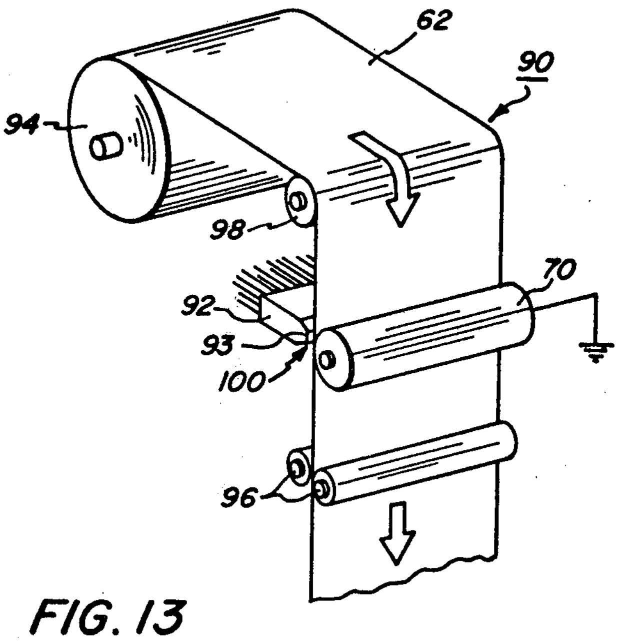
FIG. 13 is a schematic perspective illustration of the electrographic printing system as employed in a multi-stylus configuration.

Electrode means 28 may be employed in a multistylus arrangement. As shown in FIG. 13, the electrographic printing system 90 includes a multistylus recording head 92. The recording medium 62 is drawn from dispensing roll 94 over guide roll 98, through the printing gap 100 formed between the forward end 93 of the head 92 and conductive pigment roll 70 by means of a pair of drive rolls 96.

The spacing of the stylus ends in head 92 may range from 1½ mils to 9 mils in a dielectric medium while the diametrical size of the stylus electrode ends in the dielectric medium vary from ½ mil to 3 mils. As is well known in the art, two or more rows for staggered stylus electrodes may be employed in the head 92 and an alternate phase, multiplex addressing scheme may be employed to produce alphanumeric and graphic information on dielectric layer 66 of the recording medium 62, facing the recording head 92.

While the invention has been described in conjunction with specific embodiments, it is evident that many alternatives, modifications and variations will be apparent to those skilled in the art in light of the foregoing description. Accordingly, it is intended to embrace all such alternatives, modifications, and variations as fall within the spirit and scope of the appended claims.

What is claimed is:

1. An electrographic printing system wherein printing is accomplished in a recording gap between oppositely opposed electrode means between which a recording medium is transposed comprising print electrode means comprising at least one print electrode and a dielectric collar surrounding the print end portion of said print electrode, a thin dielectric layer forming a part of said recording medium and facing said print electrode means, the end portion of said print electrode and the end surface of said collar being substantially flush and disposed adjacent to said dielectric layer, complement electrode means positioned for conducting current through said recording medium via said print electrode means, a conductive solid pigment medium being a constituent of said complement electrode means, circuit means connected to apply a potential difference between said print and complement electrode means to induce current flow and discharge therebetween sufficient to create an aperture in said dielectric layer and the erosion of a minute portion of said pigment medium therethrough whereby a pigment particle aerosol is created between said print electrode means and said dielectric layer, said dielectric collar contributing to the local confinement and dwell period of said aerosol at the lip of said aperture to permit the deposition of said particles therefrom on said dielectric layer substantially in the form of a torus around said aperture lip thereby optimizing the confinement and ultimate resolution of formed pigment marks on said recording medium.

2. An electrographic printing system wherein printing is accomplished in a recording gap between oppositely opposed electrode means between which a recording medium is transposed comprising print electrode means comprising at least one print electrode and a dielectric collar surrounding the print end portion of said print electrode, a recording medium comprising a combination of a thin dielectric layer, an intermediate layer and a conductive base layer, said dielectric layer facing said print electrode means, the end portion of said print electrode and the end surface of said collar being substantially flush and disposed adjacent to said dielectric layer, complement electrode means positioned for conducting current through said recording medium via said print electrode means, a conductive solid pigment medium being a constituent of said intermediate layer, circuit means connected to apply a potential difference between said print and complement electrode means to induce current flow and discharge therebetween sufficient to create an aperture in said dielectric layer and the erosion of a minute portion of said pigment medium therethrough whereby a pigment particle aerosol is created between said print electrode means and said dielectric layer, said dielectric collar contributing to the local confinement and dwell period of said aerosol at the lip of said aperture to permit the deposition of said particles therefrom on said dielectric layer substantially in the form of a torus around said aperture lip thereby optimizing the confinement and ultimate resolution of formed pigment marks on said recording medium.

3. The electrographic printing system of claim 1 wherein said recording medium comprises said dielectric layer positioned on a conductive base layer.

4. The electrographic printing system of claim 3 wherein said solid conductive pigment medium is positioned against said recording medium on the side thereof opposite to said print electrode means.

5. The electrographic printing system of claims 2, 3 or 4 wherein said condutive solid pigment medium comprises a carbon black writing material and a thermoplastic medium.

6. An electrographic printing system comprising print electrode means including at least one electrical print electrode surrounded by a dielectric collar, the end portions of said dielectric collar and electrode being substantially flush and the area ratio of the end portions of said collar to said electrode being about 3 to 1, complement electrode means positioned in opposite opposed relation to said print electrode means, a recording medium disposed in a printing gap formed between said electrode means, said medium including a dielectric layer on its surface facing said print electrode means, a solid conductive pigment medium forming a part of said complement electrode means, circuit means connected to apply a potential difference between said print and complement electrode means to induce dielectric breakdown of said recording medium and current flow therethrough sufficient to create an aperture in said recording medium and the erosion of a minute amount of said pigment medium therethrough creating a pigment particle aerosol on said print electrode side of said recording medium, said dielectric collar contributing to the local confinement and dwell period of said aerosol at the lip of said aperture to permit the deposition of said particles therefrom on said recording medium substantially in the form of a torus around said aperture lip.

7. An electrographic printing system comprising print electrode means including at least one electrical print electrode surrounded by a dielectric collar, the end portions of said dielectric collar and electrode being substantially flush and the area ratio of the end portions of said collar to said electrode being about 3 to 1, complement electrode means positioned in opposite opposed relation to said print electrode means, a recording medium disposed in a printing gap formed between said electrode means, said medium including a dielectric layer on its surface facing said print electrode means, a solid conductive pigment medium forming a part of said recording medium, circuit means connected to apply a potential difference between said print and complement electrode means to induce dielectric breakdown of said recording medium and current flow therethrough sufficient to create an aperture in said recording medium and the erosion of a minute amount of said pigment medium therethrough creating a pigment particle aerosol on said print electrode side of said recording medium, said dielectric collar contributing to the local confinement and dwell period of said aerosol at the lip of said aperture to permit the deposition of said particles therefrom on said recording medium substantially in the form of a torus around said aperture lip.

8. The electrographic printing system of claim 6 wherein said recording medium comprises a conductive base layer upon which said dielectric layer is disposed, means to support said recording medium at said printing gap and including a solid conductive pigment medium.

9. The electrographic printing system of claim 8 wherein said support means is a roll of solid conductive pigment medium.

10. The electrographic printing system of claim 8 wherein said support means is a sheet of solid conductive pigment medium.

11. In an electrographic printing system employing oppositely opposed print and complement electrode means to produce a dielectric breakdown through arecording medium transportable in a printing gap between said electrode means and form a visble image on the surface of said recording medium by transfer of pigment particles from a solid pigment medium to said recording medium surface, wherein the improvement comprises, in combination:

an electrically conductive print electrode having a dielectric collar surrounding said electrode and wherein the area relationship of the end portion of said collar to that of said electrode is about 3 to 1, a dielectric overlayer on the surface of said recording medium facing said print electrode, energization means to form an aperture in said dielectric overlayer or through said recording medium to permit the ablation of a minute portion of an exposed conductive pigment medium, the formation of a pigment particle aerosol and its expulsion out through said aperture, the combination of said dielectric collar and dielectric overlayer contributing to the local confinement and dwell period of said aerosol at the lip of said aperture to form a pigment torus deposited about said aperture lip.

12. The electrographic printing system of claim 11 wherein said solid conductive pigment medium is an intermediate layer of said recording medium, being sandwiched between said dielectric overlayer and a conductive base substrate layer.

13. The electrographic printing system of claim 11 wherein said recording medium comprises a conductive base layer upon which said dielectric layer is disposed, means to support said recording medium at said printing gap and including a solid conductive pigment medium.

14. The electrographic printing system of claim 13 wherein said support means is a sheet of solid conductive pigment medium.

15. The electrographic printing system of claim 13 wherein said support means is a sheet of solid conductive pigment medium.

16. A process of electrographic printing wherein a print and complement electrode means are placed in spaced opposed relation to provide a printing gap therebetween through which a recording medium is transported and wherein said medium includes a dielectric overlayer, said process comprising the steps of applying an electrical potential across said electrode means forming an aperture in at least said medium dielectric layer exposing a solid pigment medium therebeneath, inducing a pigment aerosol containing particles that are characterized by having free radicals that have high chemical reactivity due to the energy created in the formation of said aperture, said induced aerosol expelled out of said aperture, controlling the aerosol formation, containment and final deposition to an immediate region at the lip of said aperture.

17. The process according to claim 16 wherein the step of control is accomplished, in part, by the combination of said dielectric overlayer and a dielectric collar provided on said print electrode means.

* * * * *